(12) United States Patent
Breuer et al.

(10) Patent No.: US 6,261,530 B1
(45) Date of Patent: Jul. 17, 2001

(54) CATIONIC LAYER COMPOUNDS, PRODUCTION AND USE

(75) Inventors: Wolfgang Breuer, Korschenbroich; Christoph Lohr, Dortmund; Joerg-Dieter Klamann, Bremerhaven; Wolfgang Ritter, Haan, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 08/930,018

(22) PCT Filed: Mar. 15, 1996

(86) PCT No.: PCT/EP96/01136
§ 371 Date: Sep. 25, 1997
§ 102(e) Date: Sep. 25, 1997

(87) PCT Pub. No.: WO96/30440
PCT Pub. Date: Oct. 3, 1996

(30) Foreign Application Priority Data

Mar. 25, 1995 (DE) .............................................. 195 11 016

(51) Int. Cl.$^7$ ....................................................... C01F 7/00
(52) U.S. Cl. ........................... 423/430; 423/432; 524/436
(58) Field of Search ................................... 423/430, 432; 524/436

(56) References Cited

U.S. PATENT DOCUMENTS

| | | | |
|---|---|---|---|
| 3,539,306 | * 11/1970 | Kumura et al. | 423/432 |
| 3,796,792 | 3/1974 | Miyata et al. | 423/250 |
| 3,879,523 | 4/1975 | Miyata et al. | 423/250 |
| 3,879,525 | 4/1975 | Miyata et al. | 423/277 |
| 4,299,759 | 11/1981 | Miyata et al. | 260/45.7 R |
| 4,447,417 | 5/1984 | Spickett et al. | 424/156 |
| 4,539,195 | 9/1985 | Schanz et al. | 423/419 |
| 4,560,545 | 12/1985 | Spickett et al. | 423/430 |
| 4,656,156 | 4/1987 | Chanakya | 502/415 |
| 5,073,584 | 12/1991 | Meszaros et al. | 524/101 |
| 5,416,135 | 5/1995 | Endres et al. | 523/205 |
| 5,416,141 | 5/1995 | Endres et al. | 524/109 |

FOREIGN PATENT DOCUMENTS

| | | |
|---|---|---|
| 15 92 126 | 10/1970 | (DE) . |
| 20 61 114 | 7/1971 | (DE) . |
| 29 05 256 | 8/1979 | (DE) . |
| 30 19 632 | 11/1981 | (DE) . |
| 33 06 822 | 8/1984 | (DE) . |
| 0 117 289 | 9/1984 | (EP) . |
| 0 189 899 | 8/1986 | (EP) . |
| 0 377 428 | 7/1990 | (EP) . |
| WO91/19679 | 12/1991 | (WO) . |
| WO92/06135 | 4/1992 | (WO) . |
| WO92/20619 | 11/1992 | (WO) . |
| WO92/20732 | 11/1992 | (WO) . |
| WO93/22237 | 11/1993 | (WO) . |

OTHER PUBLICATIONS

Chemtec 58–63 (Jan. 1986).
Römpp 's Chemie Lexikon 1(8):423 (1979).
Encyclopedia of Chemical Technology, vol. 7, 3rd ed., 840–41 (1979).
Ullmann's Encyclopedia of Industrial Chemistry, vol. A8, 5th ed., 586–601 (1987).
Ullman's Encyclopedia der technischen Chemie, vol. 19(4): 2–11 (1980).
Ullmann's Encyclopedia der technischen Chemie, vol. 16(4):254–57 (1978).

* cited by examiner

Primary Examiner—Veronica P. Hoke
(74) Attorney, Agent, or Firm—John E. Drach; Real J. Grandmaison; Thomas F. Roland

(57) ABSTRACT

A process for stabilizing a halogen-containing plastic against thermal or photochemical degradation by adding to the plastic an additive consisting essentially of cationic layer compounds corresponding to general formula (I):

$$[M^{(II)}_x Al(OH)_y](A^{n-})_z \cdot mH_2O \qquad (I)$$

where $M^{(II)}$ represents at least one divalent metal ion and $A^{n-}$ represents an acid anion having the charge $n-(n=1, 2$ or $3)$ and $1<x<5$, $y>z$, $(y+nz)=2x+3$ and $0<m<10$, and wherein the cationic layer compounds have been prepared by adding alkali metal hydroxide to a water-containing mixture of at least one source of divalent metal ions $M^{(II)}$, one source of the anion $A^{n-}$ and crystalline aluminum hydroxide in a quantity of 1 to 20 mole-%, based on aluminum hydroxide, heating the mixture for 10 to 240 minutes at a temperature of 100° C. to 240° C., and drying the mixture to form a powder without previous separation of the solid from the aqueous phase.

8 Claims, No Drawings

CATIONIC LAYER COMPOUNDS, PRODUCTION AND USE

BACKGROUND OF THE INVENTION

1. Field of the Invention

This invention relates to special cationic layer compounds of the hydrotalcite type, to a process for their production and to their use as co-stabilizers for halogen-containing plastics stabilized in particular with calcium and/or zinc salts.

It is known that halogen-containing plastics or molding compounds produced from them tend to degrade or decompose on exposure to heat or ultraviolet light. To counteract this, heavy metal compounds based on lead, tin, barium and/or cadmium are normally used. For reasons of factory hygiene, however, there is a need to replace these thoroughly effective stabilizers by less health-damaging materials. Possible alternative stabilizers to the heavy metal compounds are, for example calcium and zinc soaps, but unfortunately they do not perform as well as the heavy metal compounds mentioned above so that co-stabilizers have to be used in order to enhance their stabilizing effect.

2. Discussion of Related Art

German patent DE-C-30 19 632 describes the use of hydrotalcites for inhibiting the thermal or ultraviolet degradation of halogen-containing thermoplastic resins. This patent specification discloses test results which show that, when readily commercially available hydrotalcites are incorporated, for example, in vinyl chloride resins, they accelerate the dechlorination of the resins on heating or even cause decomposition, blackening or foaming of the resins. In addition, it was found that these hydrotalcites show poor dispersibility in the resins and adversely affect the rheological properties of the resins during molding and also the appearance of the molded products obtained. These test results are attributed to the small crystal size of the usual hydrotalcites and to the large specific BET surface of at least about 50 $m^2/g$ and the coverage of the hydrotalcite particles with water. Accordingly, it is proposed in German patent DE-C-30 19 632 to use hydrotalcites which have a large crystal size and a specific BET surface of no larger than 30 $m^2/g$ and which may optionally be coated with an anionic surfactant, such as sodium stearate. European patent application EP-A-189 899 also describes resin compositions containing hydrotalcites having specific BET surfaces below 30 $m^2/g$. It is known from this European patent application that the hydrotalcites can be modified with higher fatty acid esters, anionic surfactants and coupling agents of the silane or titanium type in order to improve the compatibility of the hydrotalcite with the resins. According to cited European patent application EP-A-189 899, the hydrotalcites are said to be modified by mechanical mixing with the modifying agents in pure or dissolved form.

DE-C-33 06 822 teaches that hydrotalcites with the formula $[Mg_6Al_2(OH)_{12}](CO_3)_3 \cdot 4H_2O$ are obtained by reaction of "active" aluminium hydroxide with magnesium hydroxide or magnesium oxide in the presence of basic magnesium carbonate as carbonate ion donor at a temperature of 50 to 100° C. and subsequent spray drying from the suspension. This process presupposes the availability of "active" aluminium hydroxide which can be obtained, for example, by precipitation from aluminium salt solutions and storage in gel form. Accordingly, this process involves an additional production step (precipitation and washing out of the aluminium hydroxide gel) or makes it necessary to obtain such a gel from a manufacturer and hence to transport large quantities of water which adversely affects the economy of the process.

U.S. Pat. No. 4,656,156 describes a process for producing hydrotalcite in which the aluminate liquor of the Bayer process is used as the aluminium component. The Bayer liquor is reacted with "active" magnesium oxide which can be obtained, for example, by calcining magnesium carbonate. This process can only be economically used in places where the Bayer liquor itself accumulates because otherwise relatively large quantities of water would again have to be transported.

DE-A-15 92 126 describes the production of hydrotalcites from different starting materials, for example from a suspension of solid aluminium hydroxide, solid magnesium hydroxide and sodium hydrogen carbonate. The reactions are carried out in batches and the products are separated from the water phase by filtration or centrifugation and washed before they are dried. The filtration or centrifugation of the very fine-particle reaction products and their subsequent washing are both complicated and time-consuming process steps which add significantly to the production costs.

The problem addressed by the present invention was to provide co-stabilizers for halogen-containing plastics which

- would be compatible with calcium and/or zinc compounds,
- would be dispersible in halogen-containing plastics without adversely affecting their rheological properties,
- would be capable of effectively trapping the decomposition products of halogen-containing plastics and
- would be inexpensive to produce, and a process for the production of these co-stabilizers.

DESCRIPTION OF THE INVENTION

The present invention relates to formulations for stabilizing halogen-containing plastics against thermal or photochemical degradation which contain cationic layer compounds corresponding to general formula (I):

$$[M^{(II)}_xAl(OH)_y](A^{n-})_z \cdot mH_2O \qquad (I)$$

where $M^{(II)}$ stands for at least one divalent metal ion and $A^{n-}$ stands for an acid anion with the charge n–(n=1, 2 or 3) and the conditions 1<x<5, y>z, (y+nz) =2x+3 and 0<m<10 are fulfilled, characterized in that they are obtainable by adding alkali metal hydroxide to a water-containing mixture of at least one source of divalent metal ions $M^{(II)}$, one source of the anions $A^{n-}$ and crystalline aluminium hydroxide in a quantity of 1 to 20 mole-%, based on aluminium hydroxide, heating the mixture for 10 to 240 minutes to a temperature of 100 to 240° C. and drying the mixture to form a powder without previous separation of the solid from the aqueous phase.

The cationic layer compounds corresponding to general formula I are compounds known per se of which the structure and preparation are described, for example, by W. T. Reichle in Chemtec (January 1986), pages 58 to 63. Cationic layer compounds corresponding to general formula I in which $M^{(II)}$ represents at least one divalent metal ion selected from the group consisting of magnesium, calcium and zinc are preferred for the purposes of the invention. In a preferred embodiment, $M^{(II)}$ represents only one divalent metal ion from the group mentioned, more particularly magnesium. Cationic layer compounds corresponding to general formula I, in which $A^{n-}$ represents an acid anion having a charge of n selected from the group of anions consisting of carbonate, hydrogen carbonate, perchlorate, acetate, nitrate, tartrate, oxalate and iodide, preferably carbonate, are most particularly preferred. Where reference is made to at least one divalent metal ion in the explanation of formula I above, it means that different divalent metal ions may also be present alongside one another in the cationic layer compound. The indices x, y and z and m may represent whole or broken numbers within the limits mentioned. Cationic layer compounds corresponding to general formula I, in which $M^{(II)}$ represents magnesium and $A^{n-}$ represents carbonate, are particularly advantageous. Examples of suitable cationic layer compounds are synthetic hydrotalcites which are also known as basic aluminium/magnesium carbonates and which are generally produced by the process described in DE-B-15 92 126 and by the processes described in DE-A-20 61 114 or DE-A 29 05 256. Hydrotalcites corresponding to the formula $[Mg_6Al_2(OH)_{16}]CO_3 \cdot mH_2O$ or to the formula $[Mg_4Al_2(OH)_{12}]CO_3 \cdot mH_2O$, in which m is as already defined, are most particularly preferred.

Suitable sources of divalent metal ions are their carbonates, hydroxocarbonates, hydroxides, oxides or their water-soluble salts, for example nitrates, chlorides, sulfates or perchlorates. Sources of divalent metal ions which already contain the anion $A^{n-}$ are particularly preferred. In this case, there is no need to add an additional source of these anions. For example, it is particularly preferred to use at least part of the divalent metal ions as carbonates or as hydroxocarbonates. If only the oxides or hydroxides are used as the source of divalent metal ions, an additional source of the anions $A^{n-}$, for example in the form of alkali metal salts, has to be used. Alkali metal salts of carbonic acid and/or of oxo acids of halogens, for example perchloric acid, are preferred and may be added to the reaction mixture in quantities of 1 to 100 mole-%, based on the aluminium content. For example, sodium carbonate may be added to the reaction mixture.

Crystalline aluminium hydroxide known, for example, as gibbsite, hydrargillite or bayerite is used as the aluminium source. The gibbsite obtained in the Bayer process is preferably used. There is no need to use aluminium in dissolved form, for example as aluminate liquor in accordance with U.S. Pat. No. 4,656,156 or in "active" form, for example as a gel in accordance with DE-C-33 06 822. Reacting the crystalline aluminium hydroxide to be used in accordance with the invention with the source of divalent metal ions to form the cationic layer compound requires temperatures in the range from about 100 to about 240° C. and reaction times of about 10 to about 240 minutes. In addition, a catalytically active quantity of alkali metal hydroxide has to be added to the water-containing mixture before it is heated to the reaction temperature. The necessary quantity of alkali metal hydroxide is about 1 to about 20 mole-%, based on aluminium hydroxide, and preferably about 2 to about 10 mole-%. For economic reasons, sodium hydroxide is preferably used as the alkali metal hydroxide although potassium hydroxide, for example, could also be used. If the quantity of alkali metal hydroxide added is reduced below the lower limit according to the invention, the reaction of the aluminium hydroxide with the source of divalent metal ions to form the cationic layer compound is not complete. Quantities of alkali metal hydroxide exceeding the upper limit according to the invention, although not harmful to the course of the reaction, nevertheless have an adverse effect on the stabilizing properties of the powder obtainable after drying of the reaction mixture.

At reaction temperatures below about 100° C. and with reaction times of less than about 10 minutes, formation of the cationic layer compound is not complete. Reaction temperatures above 240° C. and reaction times of more than about 240 minutes do not afford any further advantage and, accordingly, are uneconomical.

The cationic layer compound formed under these conditions is obtained in powder form by drying without previous separation of the solid from the water phase. Since there is thus no need for the expensive process step of filtration or centrifugation, this process is particularly economical. The alkali metal ions used remain in the end product without any adverse influence on the stabilizing effect against the thermal degradation of halogen-containing plastics. The form in which the alkali metal ions are present in the end product depends on the quantity used, on the reaction conditions and on the drying process. The alkali metal ions may be present in the powder-form end product as a hydroxide, as a salt with the anion $A^{n-}$, for example as a carbonate, or as an alkali metal aluminate or as an alkali metal aluminium hydroxo salt. This is of no consequence to the use according to the invention. It may even be that the alkali metal ions are incorporated in the cationic layer compound.

Cationic layer compounds produced by this process have a specific BET surface (as measured with nitrogen) of above about 10 $m^2/g$ and preferably in the range from 50 to 200 $m^2/g$. In the context of the invention, the concept of the specific BET surface corresponds to the definition to be found in Römpp's Chemie Lexikon, Vol. 1, 8th Edition, 1979, page 423. The smaller BET surfaces, for example in the range from about 10 to about 50 $m^2/g$, are preferred when no other organic additives have been added to the reaction mixture. However, if one or more of the organic additives described below is/are added during the production of the cationic layer compounds, the BET surface of the powders obtained is preferably above about 50 $m^2/g$. This is associated with the dispersion properties of the powders obtained in the PVC matrix. If these powders do not contain an organic additive with a dispersing effect, the powder preferably consists of well developed small individual crystals adhering weakly to one another. In this case, the specific surface is well below 50 $m^2/g$. However, powders with a specific surface above 50 $m^2/g$ are preferred because of their basically greater capacity for absorbing the hydrogen chloride given off during the decomposition of PVC. However, these fine-particle powders consist of microcrystals with a pronounced tendency to form aggregates which are not dispersed sufficiently uniformly in the PVC matrix. The tendency to aggregate can be reduced and, hence, dispersibility in PVC can be improved if one or more of the additives described hereinafter is/are added to the reaction mixture at the latest before drying to form a powder, but preferably even before heating to the reaction temperature. The improved dispersion in the PVC matrix provides for an enlarged active surface for binding hydrogen chloride. If organic additives of the type described hereinafter are not added, temperatures in the upper third of the temperature range according to the invention, for example between about 185 and about 240° C., are preferably applied in the production of the cationic layer compounds to obtain products having a specific surface below about 50 $m^2/g$. If the reaction is carried out in the presence of such organic additives or if these additives are added to the reaction mixture before drying, the temperature during the production process should be below about 185° C. to obtain products having a specific surface above about 50 $m^2/g$.

Accordingly, in one special embodiment, the present invention relates to formulations for stabilizing halogen-containing plastics which additionally contain a total of about 0.5 to about 15% by weight, based on the cationic layer compound, of one or more additives selected from the following groups:

A) polyols containing 3 to 30 carbon atoms and at least two hydroxyl groups,

B) esters of partly or completely epoxidized unsaturated carboxylic acids containing 6 to 22 carbon atoms, C) full and partial esters of polyols containing 3 to 30 carbon atoms and 2 to 12 hydroxyl groups with carboxylic acids containing 6 to 22 carbon atoms, D) alkyl and aryl phosphites, E) anions of saturated or unsaturated fatty acids containing 6 to 22 carbon atoms, F) polymers with a molecular weight of 500 to 50,000 which are soluble in water with pH values above 8.

Suitable group A) additives are polyols containing at least two hydroxyl groups and a total of 3 to 30 carbon atoms. Examples of such polyols are diols containing 3 to 30 carbon atoms, such as butanediols, hexanediols, dodecanediols, and polyols, such as trimethylol propane, pentaerythritol, glycerol and technical oligomer mixtures thereof with average degrees of condensation of 2 to 10. Most particularly preferred group A) additives are polyols containing 3 to 30 carbon atoms which bear at least one hydroxyl group or one ether oxygen every 3 carbon atoms, preferably glycerol and/or technical oligoglycerol mixtures with average degrees of condensation of 2 to 10. The tris-(2-hydroxyethyl)-isocyanurate known as "THEIC" (EP-B 377 428) is also particularly suitable for use as such an additive.

The group B) additives are esters of partly or completely epoxidized unsaturated carboxylic acids containing 6 to 22 carbon atoms. Suitable esters are esters of mono-, di- and/or trihydric alcohols which are completely esterified with epoxidized unsaturated carboxylic acids containing 6 to 22 carbon atoms, such as methyl, 2-ethylhexyl, ethylene glycol, butanediol, neopentyl glycol, glycerol and/or trimethylol propane esters of epoxidized lauroleic acid, palmitoleic acid, oleic acid, ricinoleic acid, linoleic acid and/or linolenic acid. Esters of trihydric alcohols and completely epoxidized unsaturated carboxylic acids containing 12 to 22 carbon atoms are preferred, esters of glycerol with completely epoxidized unsaturated carboxylic acids containing 12 to 22 carbon atoms being particularly preferred. The carboxylic acid component may be derived, for example, from palmitoleic acid, oleic acid, elaidic acid, petroselic acid, ricinoleic acid, linolenic acid, gadoleic acid or erucic acid. The unsaturated carboxylic acids are epoxidized by known methods. As usual in oleochemistry, the epoxidized carboxylic acid glycerides may also be the technical mixtures obtained by epoxidation of natural unsaturated fats and oils. Epoxidized rapeseed oil, epoxidized unsaturated soybean oil and/or epoxidized sunflower oil from new plants is/are preferably used.

The group C) additives are full or partial esters which may be obtained by the relevant methods of preparative organic chemistry, for example by acid-catalyzed reaction of polyols with carboxylic acids. The polyol component may be selected from those already discussed in relation to group A). Preferred acid components are aliphatic, saturated and/or unsaturated carboxylic acids containing 6 to 22 carbon atoms, such as caproic acid, caprylic acid, capric acid, lauric acid, myristic acid, palmitic acid, palmitoleic acid, stearic acid, oleic acid, ricinoleic acid, linoleic acid, linolenic acid, behenic acid or erucic acid. As usual in oleochemistry, the carboxylic acid component may even be a technical mixture of the type accumulating in the pressure hydrolysis of natural fats and oils. Partial esters of glycerol and, in particular, technical oligoglycerol mixtures with average degrees of condensation of 2 to 10 and saturated and/or unsaturated aliphatic carboxylic acids containing 6 to 22 carbon atoms are preferred.

Suitable group D) additives are alkyl and aryl phosphites, preferably those corresponding to general formula (II):

(II)

in which $R^1$, $R^2$ and $R^3$ independently of one another represent an alkyl group containing 1 to 18 carbon atoms or a phenyl group. Typical examples of group D) additives are tributyl phosphite, triphenyl phosphite, dimethyl phenyl phosphite and/or dimethyl stearyl phosphite. Diphenyl decyl phosphite is preferred.

Suitable group E) additives are anions of saturated or mono- or polyunsaturated fatty acids containing 6 to 22 carbon atoms which may be linear or branched. Linear fatty acids are preferred by virtue of their easier accessibility. Pure fatty acids, for example lauric acid, myristic acid, palmitic acid, stearic acid, lauroleic acid, myristoleic acid, palmitoleic acid, oleic acid, linoleic acid or linolenic acid, are suitable. However, it is also economically attractive to use fatty acid mixtures of the type obtainable from the hydrolysis of natural oils and fats. It does not matter whether the fatty acids are used as such or in the form of preferably water-soluble salts, for example sodium or potassium salts. Since the reaction mixture is highly alkaline, the reaction product will contain the fatty acids in any event in the form of their anions.

Additives of group F) are polymers with an average (number average) molecular weight of 500 to 50,000 which are soluble in water with pH values above 8 and preferably with pH values of 9 to 12. In the present context, "soluble" means that more than 0.01% by weight of the polymeric additives and preferably at least 0.1% by weight is dissolved completely clearly, above all under the described conditions, in an aqueous solution with a pH value of 10 adjusted with alkali metal hydroxides at 20° C. In principle, any polymers known to the expert as pigment dispersants (cf. Kirk-Othmer "Encyclopedia of Chemical Technology", Vol. 7, 3rd Edition, 1979, pages 840–841 or Ullmann's "Encyclopedia of Industrial Chemistry", Vol. A8, 5th Edition, 1987, pages 586–601) may be used as polymeric additives providing they meet the solubility and molecular weight requirements. Acrylic acid and methacrylic acid homopolymers and copolymers, lignin sulfonates and trimer fatty acids are preferred polymeric additives. Particularly suitable polymeric additives are those selected from the group of polymers of acrylic acid and methacrylic acid and copolymers thereof with unsaturated monomers containing sulfonic acid groups, unsaturated monomers containing phosphonic groups, unsaturated aliphatic carboxylic acids containing 3 to 5 carbon atoms, amides or unsaturated aliphatic carboxylic acids containing 3 to 5 carbon atoms, unsaturated monomers containing amino groups and/or salts thereof, vinyl acetate, vinyl chloride, acrylonitrile, vinylidene chloride, 1,3-butadiene, styrene, alkyl styrenes containing 1 to 4 carbon atoms in the alkyl group. Examples of such polymeric additives are polyacrylic acid, polymethacrylic acid (acrylic acid and methacrylic acid and derivatives thereof are hereinafter referred to in short as (meth)acrylic acid or derivatives) and/or salts thereof, such as polysodium (meth) acrylate, copolymers of (meth)acrylic acid with maleic acid, maleic anhydride, styrene sulfonic acid, α-methyl styrene, 2-vinyl pyridine, 1-vinyl imidazole, dimethyl aminopropyl (meth)-acrylamide, 2-(meth)acrylamido-2-methyl propane sulfonic acid, (meth)acryl-amide, N-hydroxydimethyl (meth)acrylamide and/or salts thereof. Among the polymeric additives, those which are predominantly anionic in character, i.e. which contain mostly acid groups either in free form or in the form of their salts, are most particularly preferred. Polymers of (meth)acrylic acid and copolymers thereof with styrene, alkyl styrenes containing 1 to 4 carbon atoms in the alkyl group, styrene sulfonic acid, maleic acid and/or salts thereof, particularly sodium salts, and maleic anhydride are particularly preferred. The polymeric additives preferably have a molecular weight of 1,000 to 10,000. The polymeric additives may be produced by known methods, such as bulk or solution polymerization (cf. Ullmann's Encyclopädie der technischen Chemie, Vol. 19, 4th Edition, pages 2–11, 1980). Processes for the production of lignin sulfonic acid and salts thereof are also described in Ullmann's Encyclopädie der technischen Chemie, Vol. 16, 4th Edition, pages 254–257, 1978). Trimer fatty acids are commercially available products which are obtained as residues in the distillation of dimer fatty acid, such as Pripol® 1040 of Unichema or Emery® 1000 of Emery.

The use of such additives in connection with cationic layer compounds is known from WO 92/06135, WO 92/20732 and WO 92/20619.

The present invention also relates to a process for the production of cationic layer compounds corresponding to general formula (I):

$$[M^{(II)}_x Al(OH)_y][A^{n-}]_z \cdot mH_2O \qquad (I)$$

where $M^{(II)}$ stands for at least one divalent metal ion and $A^{n-}$ stands for an acid anion with the charge n–(n=1, 2 or 3) and the conditions 1<x<5, y>z, (y+nz) =2x+3 and 0<m<10 are fulfilled, characterized in that an alkali metal hydroxide is added to a water-containing mixture of at least one source of divalent metal ions $M^{(II)}$, one source of the anions $A^{n-}$ and crystalline aluminium hydroxide in a quantity of 1 to 20 mole-%, based on aluminium hydroxide, the mixture is heated for 10 to 240 minutes to a temperature of 100 to 240° C. and is then dried to form a powder without previous separation of the solid from the aqueous phase.

Particulars of the process conditions and compounds used can be found in the foregoing description.

The production process can be carried out in batches. However, it is particularly attractive to carry out the production process continuously, for example in a tube reactor. The throughflow rates should be selected so that the reaction times according to the invention are maintained. After leaving the pressure reactor, the aqueous product suspension may be dried directly or after storage, preferably by spray drying. The drying gas used may be directly or indirectly heated air, a heated inert gas, for example nitrogen, or even superheated steam.

The drying step is preferably carried out at temperatures which do not exceed the boiling point of additives A) to F) by more than 10° C., if at all. In some cases, the additional removal of water by post-drying, which is advantageously carried out at temperatures of 110° C. to 280° C., for example in a drying cabinet, leads to improved cationic layer compounds according to the invention.

If desired, the cationic layer compounds obtained after the production process may be subsequently modified with at least one other liquid or low-melting dispersing additive selected from groups A) to F) by intensive mixing at room temperature (15 to 25° C.) or at a temperature below the decomposition temperatures of the cationic layer compounds and/or the additives, preferably below 300° C. In the context of the invention, low-melting additives are understood to be additives which can be converted into the liquid state at temperatures below the decomposition temperatures mentioned above and at normal pressure. Instead of intensive mixing, the cationic layer compounds obtained after the production process may if desired be subsequently ground with one or more additives selected from groups A) to F) in the presence of polar organic solvents or water, preferably in grinding mills and, more particularly, in a ball mill, dried and optionally post-dried. In the context of the invention, polar organic solvents are understood to be hydrocarbon compounds containing at least one substituent more electronegative than carbon which are liquid at room temperature (15 to 25° C.). Corresponding hydrocarbon compounds include chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, lactic acid ethyl ester, 2-methoxyethyl acetate, tetrahydrofuran, ethylene glycol monomethyl ether, diethylene glycol monoethyl ether. For this subsequent modification, i.e. modification after drying of the cationic layer compounds produced in accordance with the invention to form a powder, the organic additives may be used in quantities of about 5 to about 100% by weight, based on the cationic layer compound.

The present invention also relates to the use of cationic layer compounds of the described type as co-stabilizers for halogen-containing plastics stabilized with calcium and/or zinc salts of carboxylic acids containing 6 to 22 carbon atoms. The cationic layer compounds according to the invention are preferably used as co-stabilizers in halogen-containing plastics and, in particular, in PVC. To this end, the cationic layer compounds are added in quantities of 0.01 to 5 parts by weight and preferably 0.1 to 3 parts by weight per 100 parts by weight of synthetic resins disregarding any organic additives which may be present. In general, they are mechanically mixed with the plastics present in granular form before molding, for example by calendering and extrusion. Commercial zinc and/or calcium salts of carboxylic acids containing 6 to 22 carbon atoms are incorporated as conventional stabilizers, generally at the same time as the cationic layer compounds. Other conventional additives, such as the heat stabilizers described in European patent application EP-A-189 899, may of course also be used. The quantities in which the stabilizers and co-stabilizers are used may vary as required, with the proviso that the total quantity of stabilizer added is within the limits of 0.5 to 5 parts by weight per 100 parts by weight of synthetic resin. Accordingly, the minimum quantity of cationic layer compound is at least 0.01% by weight.

The effect of zinc and/or calcium soaps as stabilizers for halogen-containing plastics is enhanced by the use of the cationic layer compounds according to the invention. In addition, the cationic layer compounds as co-stabilizers may readily be incorporated in the halogen-containing plastics without adversely affecting their rheological properties.

EXAMPLES

A) Production of the Cationic Layer Compounds

Example 1

70 g of aluminium hydroxide from the Bayer process (58.3% $Al_2O_3$) are added to a suspension consisting of 81 g of magnesium oxide and 188 g of magnesium hydroxide carbonate with the approximate composition $4MgCO_3 \cdot Mg(OH)_2 \cdot 4H_2O$ in 1.6 l water. 6.4 g of 50% sodium hydroxide (10 mole-%, based on aluminium hydroxide) are then added. After a short time, the reaction mixture thickens. It is then introduced into an autoclave and heated to 140° C. An internal pressure of 5 bar builds up. After a reaction time of 2 hours, the autoclave is opened and the reaction mixture is cooled. The product formed is dried to constant weight in a drying cabinet. An X-ray diffractogram and analyses confirm the identity of the hydrotalcite formed with the approximate composition $[Mg_6Al_2(OH)_{16}]CO_3 \cdot 4H_2O$. It has a BET surface of 90 $m^2/g$.

Example 2

35 g of aluminium hydroxide (58.3% $Al_2O_3$) are added to a suspension consisting of 39 mg of magnesium hydroxide and 61 g of magnesium hydroxide carbonate in 500 ml of water. 1.6 g of 50% sodium hydroxide (5 mole-%, based on aluminium hydroxide) are then added. After a short time, the reaction mixture thickens. It is introduced into an autoclave and heated to 200° C. An internal pressure of 20 bar builds up. After a reaction time of 30 minutes, the autoclave is opened and its contents are cooled. The product formed is isolated by spray drying. An X-ray diffractogram and analyses confirm the identity of the hydrotalcite formed with the approximate composition $[Mg_6Al_2(OH)_{16}]CO_3 \cdot 4H_2O$. BET surface: 28 $m^2/g$.

Example 3

21 g of an aluminium hydroxide (58.3% $Al_2O_3$) are added to a suspension consisting of 8 g of magnesium oxide and 57 g of magnesium hydroxide carbonate in 350 ml of water. 1.0 g of 50% sodium hydroxide (5 mole-%, based on aluminium hydroxide) is then added. After a short time, the reaction mixture thickens. It is introduced into an autoclave and heated to 180° C. An internal pressure of 12 bar builds up. After a reaction time of 30 minutes, the autoclave is opened and its contents are cooled. The product formed is isolated by spray drying. An X-ray diffractogram confirms the identity of the hydrotalcite formed with the approximate composition $[Mg_4Al_2(OH)_{10}]CO_3 \cdot 4H_2O$. BET surface: 75 $m^2/g$.

Example 4

50 g of sodium perchlorate are added to a suspension consisting of 24 g of magnesium oxide and 35 g of aluminium hydroxide in 550 ml of water. 1.6 g of 50% sodium hydroxide are then added. A short time after homogenization, the reaction mixture thickens. It is introduced into an autoclave and heated to 180° C. An internal pressure of 12 bar builds up. After a reaction time of 1 hour, the autoclave is opened and its contents are cooled. The product formed is spray-dried. An X-ray diffractogram confirms the identity of the hydrotalcite formed with the approximate composition $[Mg_4Al_2(OH)_{12}](ClO_4)_2 \cdot 4H_2O$. BET surface: 35 $m^2/g$.

Example 5

21 g of sodium carbonate are added to a suspension consisting of 48 g of magnesium oxide and 35 g of aluminium hydroxide in 550 ml of water. 1.6 g of 50% sodium hydroxide are then added. A short time after homogenization, the reaction mixture thickens. It is then introduced into an autoclave and heated to 180° C. An internal pressure of 12 bar builds up. After a reaction time of 1 hour, the autoclave is opened and its contents are cooled. The product formed is spray-dried. An X-ray diffractogram and analyses confirm the identity of the hydrotalcite formed with the approximate composition $[Mg_6Al_2(OH)_{16}]CO_3 \cdot 4H_2O$. BET surface: 55 $m^2/g$.

Example 6

12 g of glycerol are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3 \cdot 4H_2O$. BET surface: 85 $m^2/g$.

Example 7

70 g of aluminium hydroxide from the Bayer process (58.3% $Al_2O_3$) are added to a suspension consisting of 81 g of magnesium oxide and 188 g of magnesium hydroxide carbonate with the approximate composition $4MgCO_3 \cdot Mg(OH)_2 \cdot 4H_2O$ in 1.6 l water. 12.8 g of 50% sodium hydroxide (20 mole-%, based on aluminium hydroxide) are then added. After a short time, the reaction mixture thickens. It is then introduced into an autoclave and heated to 140° C. An internal pressure of 5 bar builds up. After a reaction time of 2 hours, the autoclave is opened and the reaction mixture is cooled. The product formed is dried to constant weight in a drying cabinet. An X-ray diffractogram and analyses confirm the identity of the hydrotalcite formed with the approximate composition $[Mg_6Al_2(OH)_{16}]CO_3 \cdot 4H_2O$. BET surface: 85 $m^2/g$.

Example 8

20 g of epoxidized soybean oil (saponification number 125, epoxide oxygen content 5.8% by weight) are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3 \cdot 4H_2O$. BET surface: 78 $m^2/g$.

Example 9

15 g of pentaglycerol with an average degree of condensation of 5, and average molecular weight of 380 and a hydroxyl value of about 1012 are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3 \cdot 4H_2O$. BET surface: 90 $m^2/g$.

Example 10

25 g of diglycerol/$C_{12/18}$ cocofatty acid monoester are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3.4H_2O$. BET surface: 80 m$^2$/g.

Example 11

5 g of sodium stearate are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3.4H_2O$. BET surface: 75 m$^2$/g.

Example 12

20 g of a copolymer of 46% by weight of styrene, 23% by weight of α-methyl styrene and 31 % by weight of acrylic acid with a molecular weight (weight average) of 6,000 are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3.4H_2O$. BET surface: 85 m$^2$/g.

Example 13

15 g of a copolymer of 95% by weight of methyl acrylate and 5% by weight of dimethylaminopropyl methacrylamide with a molecular weight (weight average) of 5,000 are added to the suspension of Example 1 in a holding vessel. The suspension is then pumped into a prepared tube reactor heated to 140° C. under a pressure of >6 bar. The throughflow rate was selected so that the average residence time would be 40 minutes. The product was directly spray-dried. An X-ray diffractogram and analyses confirm the identity of the hydrotalcite formed with the approximate composition $[Mg_6Al_2(OH)_{16}]CO_3.4H_2O$. BET surface: 85 m$^2$/g.

Comparison Example 1

35 g of aluminium hydroxide (58.3% $Al_2O_3$) are added to a suspension consisting of 27 g of magnesium oxide and 61 g of magnesium hydroxide carbonate in 500 ml of water. In this case, no sodium hydroxide was added. No thickening occurred. The reaction mixture is introduced into an autoclave and heated to 180° C. An internal pressure of 12 bar builds up. After a reaction time of 2 hours, the autoclave is opened and its contents are cooled. The reaction mixture is spray-dried. An X-ray diffractogram reveals only minimal formation of the hydrotalcite in addition to unreacted starting products, such as hydrargillite, magnesium hydroxide carbonate and magnesium hydroxide.

Comparison Example 2 (Alkali Source: Na Stearate)

35 g of aluminium hydroxide (58.3% $Al_2O_3$) are added to a suspension consisting of 27 g of magnesium oxide and 61 g of magnesium hydroxide carbonate in 500 ml of water. 12.3 g of sodium stearate (10 mole-%, based on Al) were added as the alkali source and as a surface modifier. No thickening occurred. The reaction mixture is introduced into an autoclave and heated to 180° C. An internal pressure of 12 bar builds up. After a reaction time of 2 hours, the autoclave is opened and its contents are cooled. The reaction mixture is spray-dried. An X-ray diffractogram reveals only minimal formation of the hydrotalcite in addition to unreacted starting products, such as hydrargillite, magnesium hydroxide carbonate and magnesium hydroxide.

Example 14

4.2 g of sodium carbonate are added to a suspension consisting of 11.9 g of $Zn(NO_3)_2.6H_2O$, 3.2 g of MgO and 3.1 g of aluminium hydroxide in 550 ml of water. 0.3 g of 50% sodium hydroxide are then added. A short time after homogenization, the reaction mixture thickens. It is then introduced into an autoclave and heated to 180° C. An internal pressure of 12 bar builds up. After a reaction time of 1 hour, the autoclave is opened and its contents are cooled. The product formed is spray-dried. An X-ray diffractogram and analyses confirm the identity of the hydrotalcite formed with the approximate composition $[Mg_4Zn_2Al_2(OH)_{16}]CO_3.4H_2O$. BET surface: 55 m$^2$/g.

A Büchi laboratory spray dryer was used for spray drying in the Examples. Drying was carried out in co-current with electrically heated air. The air entry temperatures were in the range from 160 to 200° C. while the air exit temperatures were in the range from 75 to 100° C.

B) Application Examples

Sheeted-out compounds containing stabilizer mixtures of
- 0.5 part by weight of zinc stearate,
- 0.5 part by weight of calcium stearate,
- 0.2 part by weight of stearoyl benzoyl methane (Rhodiastab® 50),
- 1.0 part by weight of the substances according to the invention,
- based on 100 parts by weight of suspension polyvinyl chloride with a K value of 65, were tested for "static stability".

To this end, polyvinyl chloride molding compounds containing stabilizer mixtures were processed to test strips on co-rotating laboratory mixing rolls measuring 450×220 mm (Berstorff) at a roll temperature of 170° C. and at a roll speed of 12.5 r.p.m. The approx. 0.5 mm thick strips were cut into square test specimens (edge length 10 mm) which were then exposed to a temperature of 180° C. in a drying cabinet having six rotating trays (Heraeus FT 420 R). Samples were taken at 15 minute intervals and examined for changes in color.

The results are set out in the following Table.

TABLE

Results of the Stability Test

| Test substance | First discoloration after minutes | End of stability (blackening) after minutes |
|---|---|---|
| No cationic layer compound | 15 | 45 |
| Example 1 | 15 | 90 |
| Example 2 | 30 | 120 |
| Example 3 | 30 | 105 |
| Example 4 | 15 | 90 |
| Example 5 | 30 | 105 |
| Example 6 | 30 | 90 |
| Example 7 | 15 | 60 |
| Example 8 | 30 | 105 |

TABLE-continued

Results of the Stability Test

| Test substance | First discoloration after minutes | End of stability (blackening) after minutes |
|---|---|---|
| Example 9 | 30 | 120 |
| Example 10 | 30 | 135 |
| Example 11 | 30 | 105 |
| Example 11*) | 30 | 120 |
| Example 12 | 30 | 120 |
| Example 12*) | 30 | 135 |
| Example 13 | 30 | 120 |
| Example 14 | 30 | 120 |

*)Post-dried to constant weight in a recirculating air drying cabinet at 200° C. after spray drying.

What is claimed is:

1. The process of preparing cationic layer compounds corresponding to general formula (I):

$$[M^{(II)}_x Al(OH)_y](A^{n-})_z \cdot mH_2O \quad (I)$$

wherein $M^{(II)}$ represents at least one divalent metal ion and $A^{n-}$ represents an acid anion having the charge n-(n=1, 2 or 3) and $1<x<5$, $y>z$, $(y+nz)=2x+3$ and $0<m<10$, comprising adding alkali metal hydroxide to a water-containing mixture of at least one source of divalent metal ions $M^{(II)}$, one source of the anion $A^{n-}$ and crystalline aluminum hydroxide in a quantity of 1 to 20 mole-%, based on aluminum hydroxide, heating the mixture for 10 to 240 minutes at a temperature of 100° C. to 240° C., and drying the mixture to form a powder without previous separation of the solid from the aqueous phase.

2. A process as in claim 1 wherein a total of 2 to 10 mole-% of alkali metal hydroxide, based on aluminum hydroxide, is added to said water-containing mixture.

3. A process as in claim 1 wherein said alkali metal hydroxide comprises sodium hydroxide.

4. A process as in claim 1 wherein in general formula (I), $M^{(II)}$ represents magnesium, calcium or zinc.

5. A process as in claim 1 including adding to said water-containing mixture from 0.5% to 15% by weight, based on the weight of said cationic layer compounds, of one or more additives selected from A) polyols containing 3 to 30 carbon atoms and at least two hydroxyl groups, B) esters of partly or completely epoxidized unsaturated carboxylic acids containing 6 to 22 carbon atoms, C) full and partial esters of polyols containing 3 to 30 carbon atoms and 2 to 12 hydroxyl groups with carboxylic acids containing 6 to 22 carbon atoms, D) alkyl and aryl phosphites, E) saturated or unsaturated fatty acids containing 6 to 22 carbon atoms, and F) polymers having a molecular weight of 500 to 50,000 which are soluble in water with pH values above 8.

6. A process as in claim 1 including adding to said water-containing mixture one or more alkali metal salts of carbonic acid or of oxo acids of halogens before it is heated to 100° C. to 240° C. in a quantity of 1 to 100 mole-%, based on the aluminum content, of said water-containing mixture.

7. A process as in claim 1 that is carried out continuously.

8. A process as in claim 1 wherein said drying is carried out by spray drying.

* * * * *